(12) United States Patent
Jauvtis

(10) Patent No.: US 9,434,445 B1
(45) Date of Patent: Sep. 6, 2016

(54) ELECTRONIC BICYCLE

(71) Applicant: Nathan Jauvtis, San Francisco, CA (US)

(72) Inventor: Nathan Jauvtis, San Francisco, CA (US)

(73) Assignee: Dr. Nathan Jauvtis Engineering, San Francisco, CA (US)

( * ) Notice: Subject to any disclaimer, the term of this patent is extended or adjusted under 35 U.S.C. 154(b) by 0 days.

(21) Appl. No.: 14/746,567

(22) Filed: Jun. 22, 2015

Related U.S. Application Data

(63) Continuation-in-part of application No. 13/784,740, filed on Mar. 4, 2013, now Pat. No. 9,085,342.

(60) Provisional application No. 61/606,373, filed on Mar. 3, 2012.

(51) Int. Cl.
*B60K 1/04* (2006.01)
*B62M 6/45* (2010.01)
*B62M 6/80* (2010.01)
*H02G 3/06* (2006.01)

(52) U.S. Cl.
CPC ................. *B62M 6/45* (2013.01); *B62M 6/80* (2013.01); *H02G 3/0616* (2013.01)

(58) Field of Classification Search
CPC .......... B62M 6/40; B62M 6/60; B62M 6/70; B62M 25/08; B62M 6/50
See application file for complete search history.

(56) References Cited

U.S. PATENT DOCUMENTS 2,457,430 A * 12/1948 Argyris .................... B62M 6/70
180/206.7

(Continued)

*Primary Examiner* — Kevin Hurley
*Assistant Examiner* — Gabriela C Craciun
(74) *Attorney, Agent, or Firm* — Peters Verny, LLP

(57) ABSTRACT

Provided herein is a power assisted motorized vehicle which can be operated in either a manual mode or a motorized mode or in a combination of manual and motorized modes. The vehicle includes, inter alia, a frame connected to at least one fork capable of supporting a wheel having a first driven sprocket assembly and a second driven sprocket assembly, a rechargeable electrical power supply attached to the frame, a motor controller attached to the frame, an electric motor supported by the frame and attached to a first driving sprocket which is coupled to the first driven sprocket assembly and a manual pedal assembly supported by the frame and comprising a pedal crank shaft with two pedals and a second driving sprocket which is coupled to the second driven sprocket assembly.

20 Claims, 12 Drawing Sheets

(56) References Cited

U.S. PATENT DOCUMENTS

| | | | | |
|---|---|---|---|---|
| 3,921,745 | A * | 11/1975 | McCulloch | B60L 7/12 180/206.1 |
| 3,991,843 | A * | 11/1976 | Davidson | B60L 11/1801 180/206.1 |
| 4,044,852 | A * | 8/1977 | Lewis | B62J 9/02 180/206.4 |
| 4,085,814 | A * | 4/1978 | Davidson | B60L 11/1801 180/206.7 |
| 4,280,581 | A * | 7/1981 | Rudwick | B62M 6/90 180/206.5 |
| 4,410,060 | A * | 10/1983 | Cunard | B62M 6/55 180/11 |
| 4,541,500 | A * | 9/1985 | Gelhard | B62M 6/70 180/205.2 |
| 4,702,094 | A * | 10/1987 | Peterson | E05B 47/0603 180/289 |
| 5,474,148 | A * | 12/1995 | Takata | B62M 6/45 180/206.2 |
| 5,560,266 | A * | 10/1996 | Shikimori | B62M 6/45 180/206.4 |
| 5,755,304 | A * | 5/1998 | Trigg | B62M 6/60 180/206.1 |
| 5,901,807 | A * | 5/1999 | Tseng | B62M 6/55 180/206.3 |
| 5,909,781 | A * | 6/1999 | Yonekawa | B62M 6/55 180/206.4 |
| 5,924,511 | A * | 7/1999 | Takata | B60L 11/1801 180/206.2 |
| 5,934,401 | A * | 8/1999 | Mayer | B62M 6/60 180/206.1 |
| 6,062,329 | A * | 5/2000 | Chai | B62M 6/10 180/206.4 |
| 6,148,944 | A * | 11/2000 | Adomi | B62M 6/90 180/206.4 |
| 6,152,251 | A * | 11/2000 | Nagai | B62K 11/04 180/206.4 |
| 6,196,347 | B1 * | 3/2001 | Chao | B62M 6/50 180/206.2 |
| 6,276,479 | B1 * | 8/2001 | Suzuki | B62M 6/45 180/206.8 |
| 6,290,014 | B1 * | 9/2001 | MacCready, Jr. | B62M 7/16 180/11 |
| 6,336,516 | B1 * | 1/2002 | McNelly | B62M 6/70 180/206.7 |
| 6,423,443 | B1 * | 7/2002 | Tsuboi | B60K 1/04 180/68.5 |
| 6,453,766 | B1 * | 9/2002 | Ose | B62M 25/02 116/28.1 |
| 6,591,929 | B1 * | 7/2003 | Tsuboi | B62M 6/70 180/206.4 |
| 6,629,574 | B2 * | 10/2003 | Turner | B62M 6/55 180/206.4 |
| 6,976,551 | B2 * | 12/2005 | Spanski | B62M 6/10 180/206.2 |
| 7,108,097 | B1 * | 9/2006 | Bolton | B62M 6/55 180/206.7 |
| 7,261,175 | B1 * | 8/2007 | Fahrner | B62M 6/55 180/206.4 |
| 7,284,631 | B2 * | 10/2007 | Rizzetto | B62M 6/55 180/206.4 |
| 7,547,021 | B2 * | 6/2009 | Bon | B62M 6/55 280/11.115 |
| 7,568,714 | B2 * | 8/2009 | Sasnowski | B62M 6/55 180/206.4 |
| 8,100,424 | B2 * | 1/2012 | Jan | B62M 1/10 180/205.4 |
| 8,616,321 | B2 * | 12/2013 | Aoki | B62M 6/45 180/206.1 |
| 8,640,805 | B2 * | 2/2014 | Kuroki | B62M 6/45 180/205.1 |
| 2003/0213630 | A1 * | 11/2003 | Pyntikov | B62M 6/40 180/220 |
| 2004/0058231 | A1 * | 3/2004 | Takeshita | H01M 2/1066 429/123 |
| 2004/0231905 | A1 * | 11/2004 | Kurita | B62M 6/60 180/206.5 |
| 2005/0039963 | A1 * | 2/2005 | Forderhase | B62M 6/55 180/206.4 |
| 2005/0087379 | A1 * | 4/2005 | Holland | B62M 6/60 180/206.5 |
| 2005/0189157 | A1 * | 9/2005 | Hays | B62M 6/45 180/206.2 |
| 2006/0201728 | A1 * | 9/2006 | Wu | B62M 6/40 180/206.2 |
| 2008/0156564 | A1 * | 7/2008 | Driessen | B62J 7/04 180/220 |
| 2009/0261134 | A1 * | 10/2009 | Tetsuka | B62M 6/90 224/412 |
| 2010/0206652 | A1 * | 8/2010 | Kielland | B62J 25/00 180/220 |
| 2011/0042156 | A1 * | 2/2011 | Vincenz | B62H 5/001 180/206.5 |
| 2011/0168471 | A1 * | 7/2011 | Duignan | B62M 6/75 180/205.7 |
| 2011/0168472 | A1 * | 7/2011 | Li et al. | B60L 11/1801 180/206.4 |
| 2011/0240391 | A1 * | 10/2011 | Bonneville | B62M 6/90 180/220 |
| 2011/0247888 | A1 * | 10/2011 | Kohlbrenner | B62M 6/70 180/206.7 |
| 2011/0272203 | A1 * | 11/2011 | Sugimoto | B60K 1/04 180/206.1 |
| 2012/0048634 | A1 * | 3/2012 | Kuroki | B62M 6/50 180/205.2 |
| 2012/0048635 | A1 * | 3/2012 | Kuroki | B62M 6/45 180/206.2 |
| 2012/0145469 | A1 * | 6/2012 | Tong | B62K 3/002 180/206.1 |
| 2012/0322594 | A1 * | 12/2012 | Kitamura | B62J 6/06 474/110 |
| 2013/0061740 | A1 * | 3/2013 | Asai | B62M 1/10 91/55 |
| 2013/0068549 | A1 * | 3/2013 | Laprade | B62M 6/70 180/206.1 |
| 2013/0092464 | A1 * | 4/2013 | Gu | B62M 6/55 180/206.4 |
| 2013/0233631 | A1 * | 9/2013 | Jauvtis | B62M 6/55 180/206.4 |
| 2015/0008059 | A1 * | 1/2015 | Douglas | B62K 25/32 180/206.1 |

\* cited by examiner

ELECTRONIC BICYCLE

CROSS-REFERENCE TO RELATED APPLICATIONS

This application is a continuation in part of U.S. patent application Ser. No. 13/784,740 filed Mar. 4, 2013, which in turn claims priority under 35 U.S.C. §119(e) from U.S. Provisional Application Ser. No. 61/606,373, filed on Mar. 3, 2012. The disclosures of the above provisional and non-provisional patent applications are hereby incorporated herein by reference in their entirety.

FIELD

Provided herein is a power assisted motorized vehicle which can be operated in either a manual mode or a motorized mode or in a combination of manual and motorized modes. The vehicle includes, inter alia, a frame connected to at least one fork capable of supporting a wheel having a first driven sprocket assembly and a second driven sprocket assembly, a rechargeable electrical power supply attached to the frame, a motor controller attached to the frame, an electric motor supported by the frame and attached to a first driving sprocket which is coupled to the first driven sprocket assembly and a manual pedal assembly supported by the frame and comprising a pedal crank shaft with two pedals and a second driving sprocket which is coupled to the second driven sprocket assembly.

BACKGROUND

Electrically assisted motorized cycles which can be operated in a manual mode or only in a motorized mode or in a combination of manual and motorized modes have been previously described in the past. However, problems associated with integration of pedal location with electrical motor placement, cycle stability during operation, sufficient power, battery charging and battery removal have prevented widespread use of these environmentally acceptable vehicles.

SUMMARY

The present invention satisfies these and other needs by providing a power assisted vehicle. Also provided are a novel battery saddle, electronic cable assembly, a throttle assembly, a motor mount assembly, a battery assembly, and a battery quick release assembly.

In one aspect, a power assisted vehicle is provided which includes a frame connected to at least one fork capable of supporting a wheel having a first driven sprocket assembly and a second driven sprocket assembly, a rechargeable electrical power supply attached to the frame, a motor controller attached to the frame and an electric motor supported by the frame and attached to a first driving sprocket which is coupled to the first driven sprocket assembly, a manual pedal assembly supported by the frame and comprising a pedal crank shaft with two pedals and a second driving sprocket which is coupled to the second driven sprocket assembly, where the motor is bi-directionally coupled to the wheel, and the pedal assembly is uni-directionally coupled to the wheel and where the location of the electric motor intersects or is tangent to the space defined by rotation of the pedal assembly and where the power supply is electrically connected to the motor controller.

In some embodiments, a power assisted vehicle is provided which includes a frame connected to a front fork and a rear fork supporting a front wheel and a rear wheel, a throttle assembly attached to the front fork, a crossbar connected to the front fork, a seat supported by the crossbar and frame, a rechargeable electrical power supply attached to the crossbar, a motor controller attached to the crossbar, a motor mount attached to the frame, a center stand attached to the motor mount, an electric motor attached to the motor mount and having a first driving sprocket coupled to a first driven sprocket assembly, wherein the motor is bi-directionally coupled to the rear wheel, a manual pedal assembly supported by the frame and comprising a pedal crank shaft with two pedals and a second driving sprocket coupled to a second driven sprocket assembly, where the pedal assembly is uni-directionally coupled to the rear wheel, a flexible motor drive member connecting the first drive sprocket to the first driven sprocket assembly coupled to the rear wheel and a flexible pedal drive member connecting the second driving sprocket to the second driven sprocket coupled to the rear wheel, where the location of the motor intersects or is tangent to the space defined by rotation of the pedal assembly and where the motor controller is electrically connected to the power supply, the throttle assembly and the motor assembly.

In another aspect, a semi-flexible cable harness assembly for a power assisted vehicle is provided. The power assisted vehicle includes a first cable harness housing attached to a fork of the vehicle, said housing pivoting with the fork, a second cable harness housing attached to the frame of the vehicle and a cable harness twisting member that connects the first cable harness housing to the second cable harness housing, said cable harness twisting member being substantially co-linear with the pivoting axis of the fork where pivoting of the fork rotates the first cable harness housing relative to the second cable harness housing.

In still another aspect, a motor mount assembly is provided. The motor mount assembly includes a center stand attached to a motor mount and an electric motor having a first motor drive sprocket wherein the electric motor is attached to the motor mount.

In still another aspect, a battery assembly is provided. The battery assembly includes battery bricks arranged in series and a housing equipped with cell taps and a high power connector where the bricks includes cells arranged in parallel.

In still another aspect, a throttle assembly is provided. The throttle assembly includes a housing, a throttle cable housing supported by the housing, a plurality of signal wires attached to the housing, a pulley attached to a electromechanical transducer shaft and a throttle cable attached to the pulley.

In still another aspect, a battery quick release apparatus is provided. The quick release apparatus includes a battery saddle assembly and a lockable battery saddle quick release lever. The saddle assembly includes a battery saddle, a battery saddle retainer and an electrical connection.

DETAILED DESCRIPTION

Figure 1:
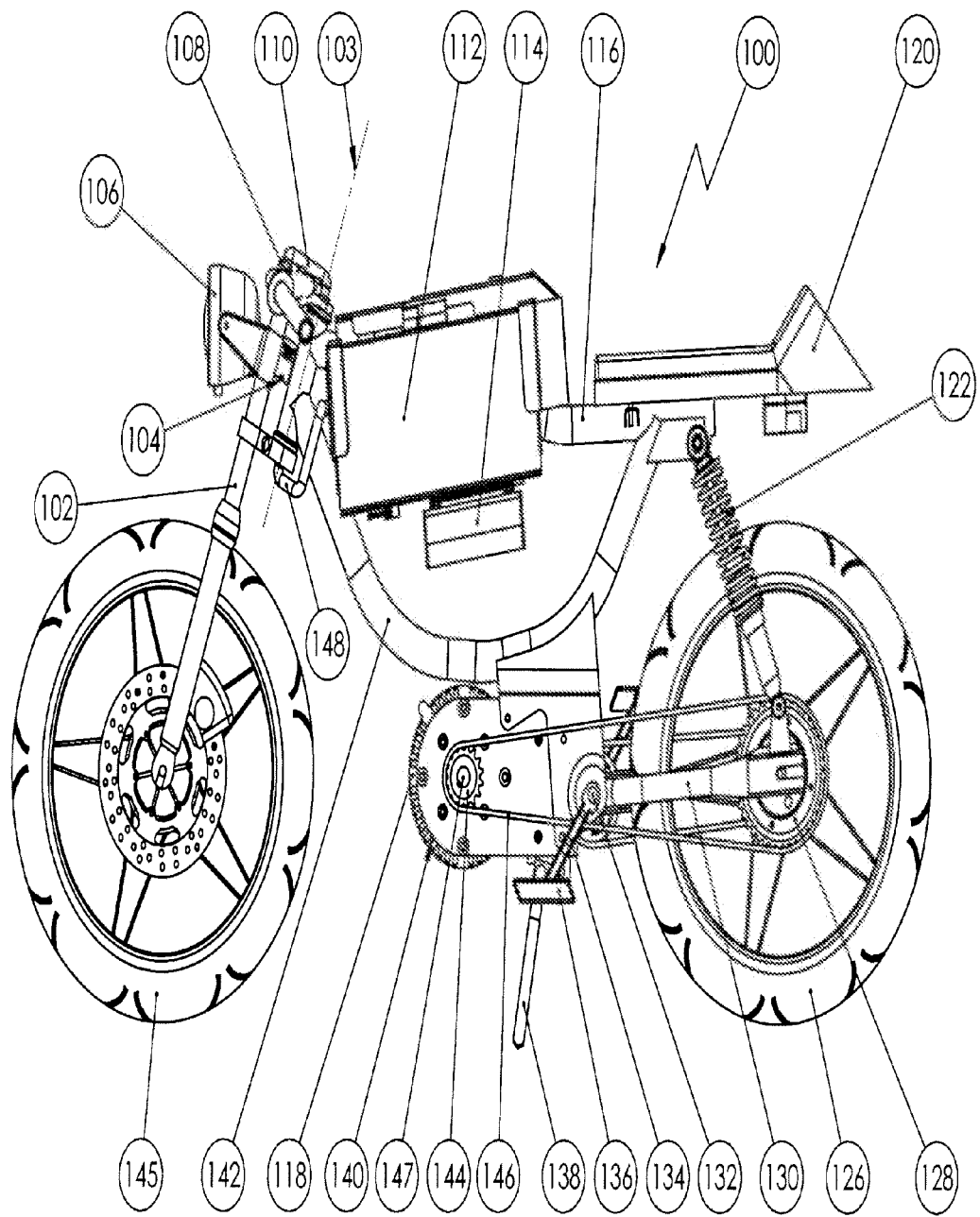
FIG. 1 illustrates a left view of the power assisted vehicle.
Figure 2:
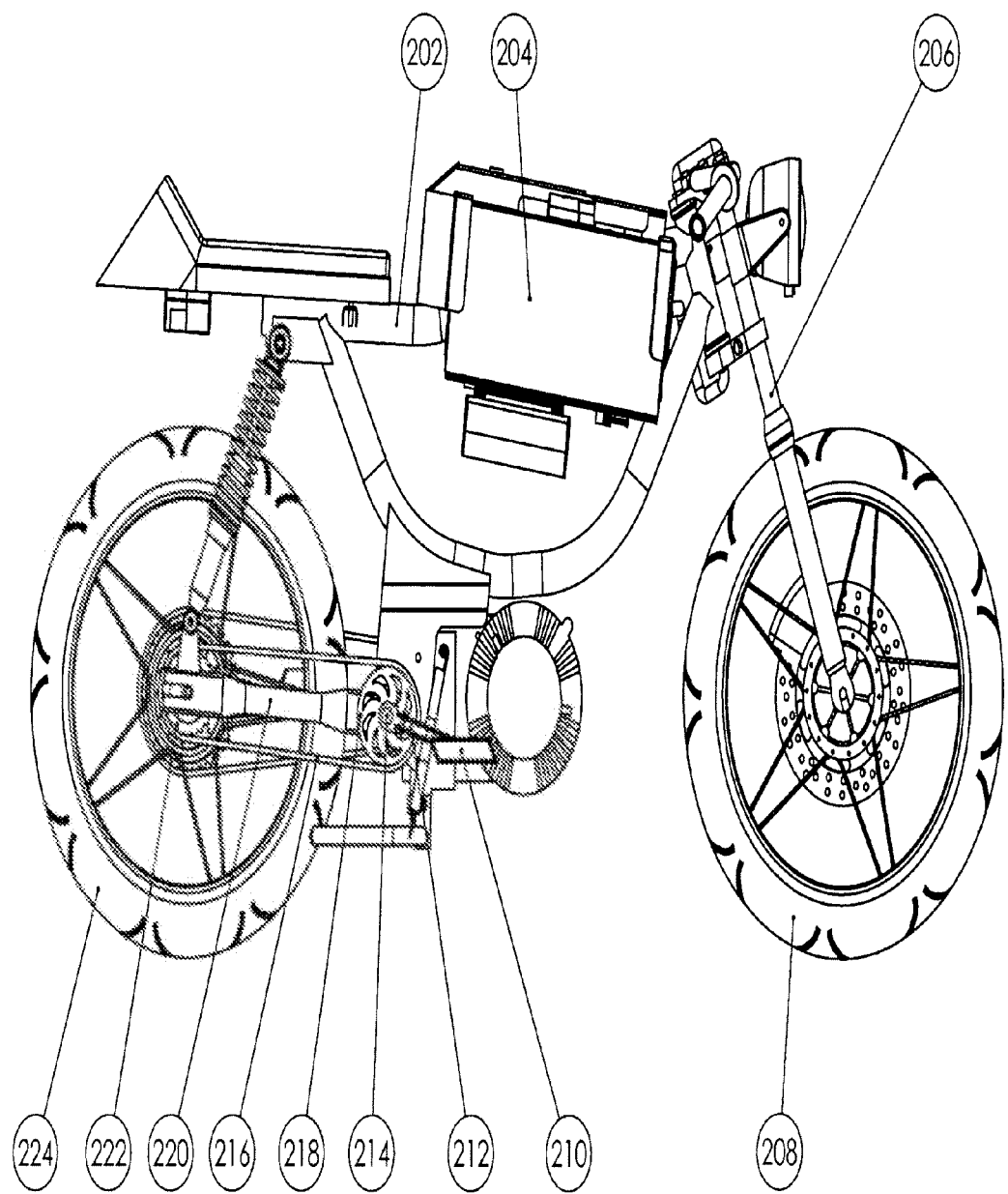
FIG. 2 illustrates a right view of the power assisted vehicle.
Figure 3:
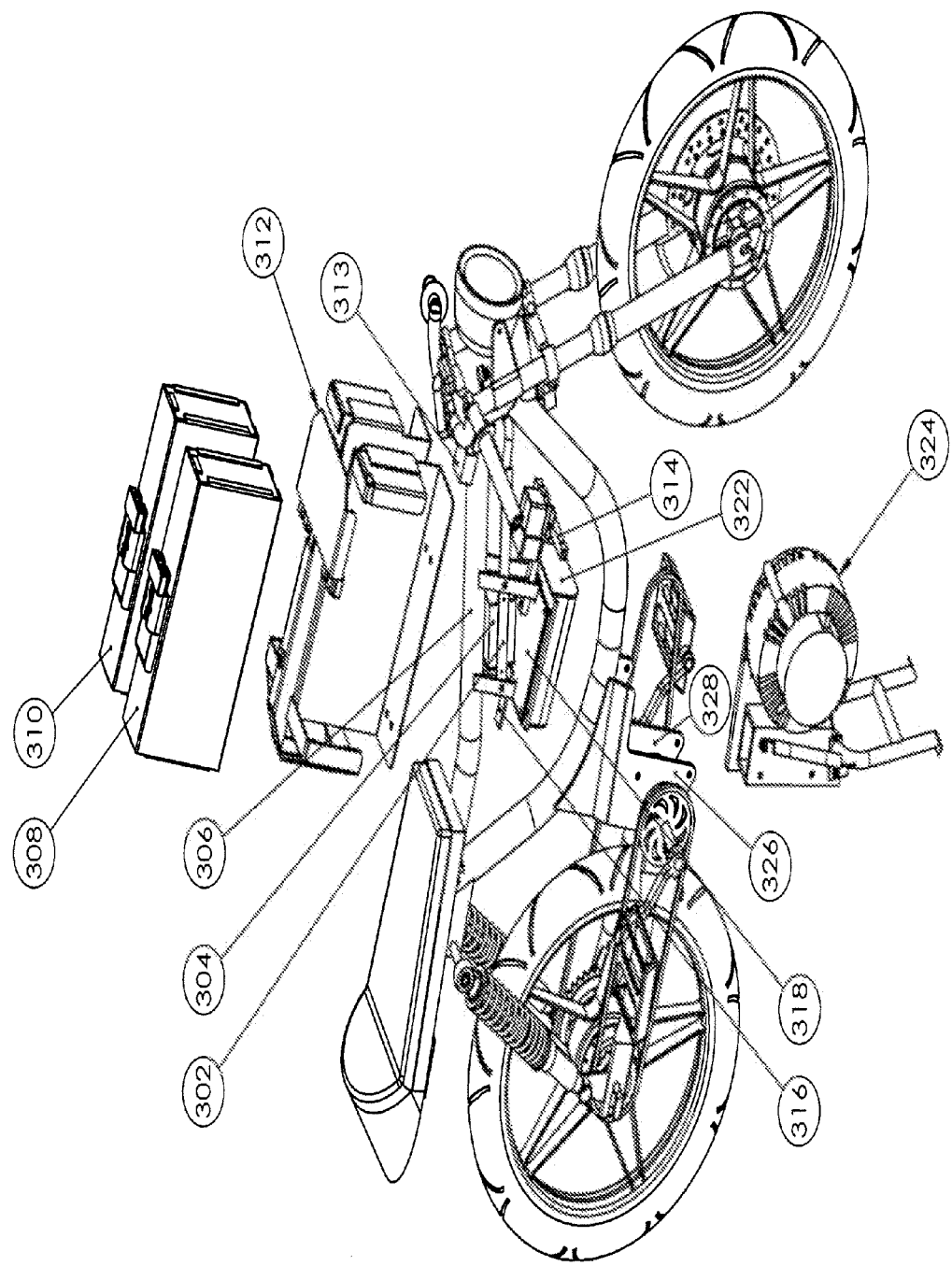
FIG. 3 illustrates a front right orthographic view with the battery assembly and the motor mount exploded.

Provided herein is a power assisted motorized vehicle which can be operated in either a manual mode or a motorized mode or in a combination of manual and motorized modes. The vehicle includes, for example, integration of pedal location with motor placement, dynamic stability under operating conditions, substantial power output with simple, efficient battery charging and battery removal and several novel and useful assemblies. The features above are best discussed with reference to the Figures disclosed herein. FIGS. 1-3 are directed towards some embodiments of the power assisted vehicle as a whole while the remaining Figs. discuss novel features which are incorporated into some embodiments of the power assisted vehicle as depicted in FIGS. 1-3 but also are independently novel. The figures illustrate exemplary embodiments of the invention and should not be treated as limiting.

Referring now to FIG. 1, which illustrates a right view of some embodiments of the power assisted vehicle 100, an electromechanical throttle assembly 104 is connected to front fork 102 attached to front wheel 145. Light 106 is connected to front fork 102, as is an upper cable harness housing 110 which couples to upper cable electronics 108. Upper cable harness 110 is connected to lower cable harness housing 148 through a cable harness twisting member (not illustrated in FIG. 1). Enclosing the cable wires in a housing avoids cable fatigue and routing problems which become increasingly important as the complexity of the electronics system increase. Left battery 112 is attached to cross bar 116 as is motor controller 114. Electric power is transferred from the battery to motor controller 114 and further to motor 118. The location of the battery, as one of the heavier components of the vehicle, is important to the stability of power assisted vehicle 100. Note that battery 112 is centrally located in an upper position between both wheels and in front of the seat in this embodiment which serves to balance vehicle 100 during operation. Also attached to crossbar 116 is seat 120 which is also supported by frame 142 and rear suspension 122 which is connected with rear wheel 126. Motor driven sprocket 128 is connected to rear wheel 126 which is also supported by rear fork 130. Rear fork 130 is coupled to frame 142 at the intersection of pedal crank shaft 132. Connected to pedal crank shaft 132 is left pedal crank 134 which is connected to left pedal 136. Center stand 138, which supports the power assisted vehicle in an upright position at rest, is attached to motor mount assembly 140 which is connected to frame 142. Motor mount assembly 140 also supports motor 118 having a motor driving sprocket 144. Motor power to drive the power assisted vehicle is transmitted by motor drive chain 146, or the equivalent, from the motor driving sprocket 144 to the motor driven sprocket 128 attached to rear wheel 126. Note that the motor 118 is bidirectionally coupled to the rear wheel 126. The horizontal axis of the motor is defined by the plane of motor drive chain 146. Integration of the motor location with the disposition of the pedals allows for easy pedal clearance with respect to the motor. Further, location of the motor in an area defined by rotation of the pedals provides the power assisted vehicle with a low center of gravity, which is helpful during operation of the vehicle. In addition, the location of the motor mount allows for high power electric motors to be used in the power assisted vehicles in some embodiments of the current invention.

Referring now to FIG. 2, which illustrates a right view of an embodiment of the power assisted vehicle, right battery 204 is attached to cross bar 202 which is connected to right front fork 206 which supports front wheel 208. Right pedal 210 is attached to right pedal crank 212 which is connected to pedal crank shaft 214 coupled to the front pedal drive sprocket 218. Mechanical power is transmitted by pedal drive chain 216 which connects front pedal driving sprocket 218 to rear pedal driven sprocket 222. Rear pedal driven sprocket 222 is coaxially and unidirectionally attached to rear wheel 224 which is supported by rear fork 220. Accordingly, the pedals can remain stationary while wheel 224 rotates in the forward direction (e.g., when the vehicle is driven by the motor only) and can also be used to manually drive the power assisted vehicle (with or without motor assistance). Also, it should be apparent to the skilled artisan, that a foot support can replace the pedals to convert the power assisted vehicle to an entirely motorized vehicle.

FIG. 3 provides illustration of integration of the battery assembly and motor mount into the overall structure of some embodiments of the power assisted vehicle. Concentrating on the battery assembly, DC/DC converter support bracket 302 is attached to crossbar 306 and supports DC/DC converter 304. Right battery 308 and left battery 310 slide into battery saddle assembly 312. Battery saddle assembly 312 supports and restrains batteries 308 and 310 and provides electrical connection between the batteries and motor controller 322. Additional features related to the battery assembly illustrated in FIG. 3 include battery saddle assembly frame anchor 313, front battery saddle support guide 314, rear battery support upper guide 316 and center support guide 318.

Figure 4:
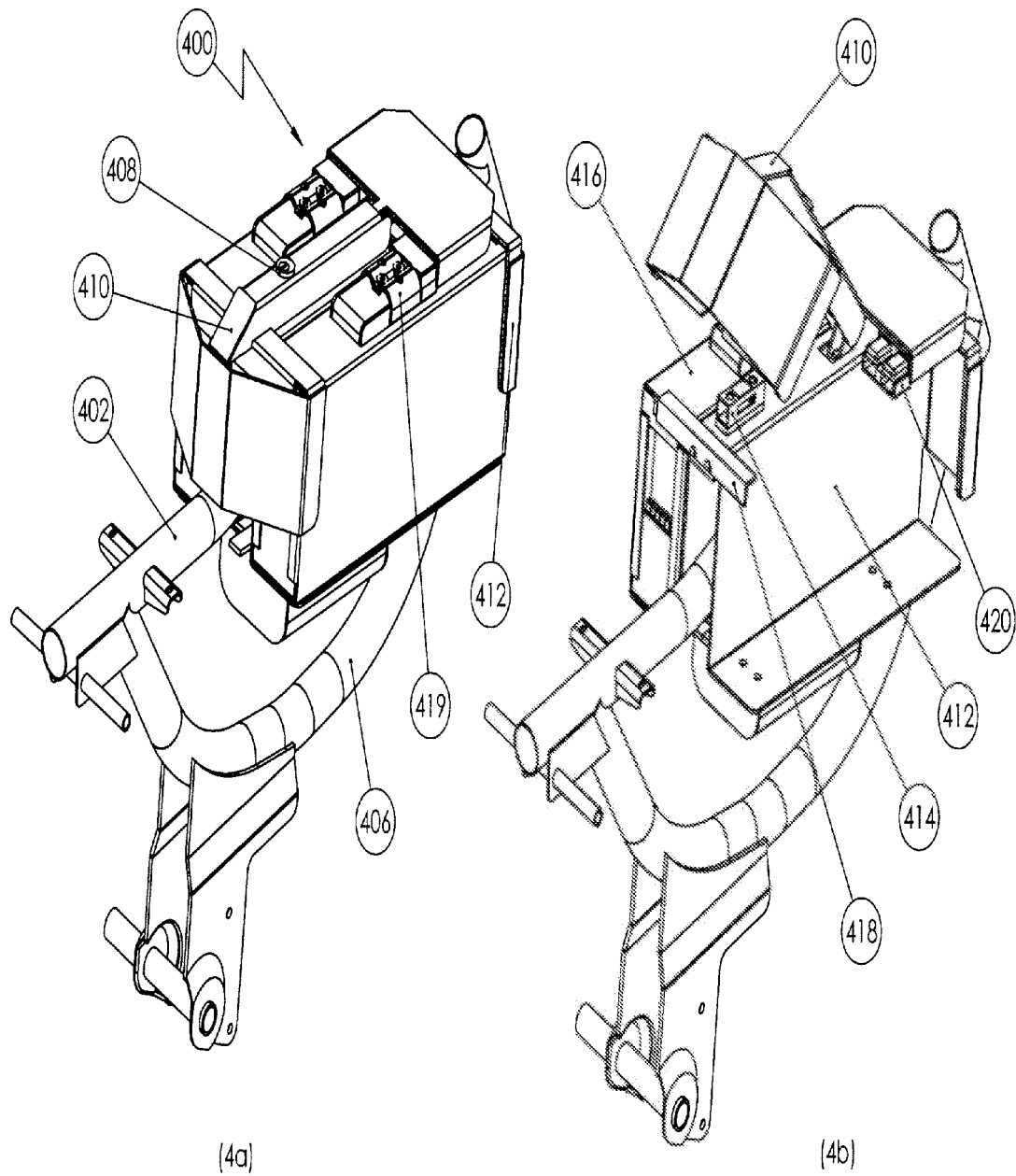
FIG. 4a illustrates a right orthographic view of the frame, the battery saddle assembly and the battery quick release apparatus with the battery quick release lever closed and locked.
FIG. 4b illustrates a right orthographic view of the frame, the battery saddle assembly and the battery quick release apparatus with the battery quick release lever open and unlocked with the right battery removed.

An important feature of the battery saddle assembly used in some embodiments of the power assisted vehicle is a quick release functionality. The battery saddle assembly is shown in a closed state in FIG. 4a, and in an open state in FIG. 4b. Referring now to FIG. 4a closed battery saddle assembly 400 is attached to crossbar 402 which is supported by frame 406. Note that in the closed state batteries are enclosed by the battery saddle 412 and battery release lever 410. Key lock 408 when locked keeps battery release lever 410 in a closed state.

Referring now to FIG. 4b, left battery 416 is enclosed by battery saddle 412 while the right battery has been removed from battery saddle 412. Battery saddle 412 has features that restrain the battery, such that when the battery saddle release lever 410 is in its open state, the battery can pivot outward and be easily removed from the power assisted vehicle. Key lock 408 is attached to lever 410 and can be selectively engaged to key lock receiver 414 which is attached to saddle 412. In alternative embodiments, battery saddle 412 is locked and unlocked using a solenoid. This solenoid may be responsive to a key pad, an ignition control, a key activated electronic switch, and/or the like. The key may be a mechanical key or an electronic key such as a USB device including a key code.

As illustrated in FIG. 4b, battery saddle 412 in conjunction with battery saddle rear upper retainer 418 provides all but one degree of freedom of restraint required to restrain batteries 308 and 310. The final degree of restraint is provided by battery saddle release lever 410, which prevents lateral movement of the rear of both right and left battery when closed. Electrical connection is formed between battery high power electric connector 419 (see FIG. 4a) and the fixed high power electric connector 420 (see FIG. 4b).

Figure 5A:
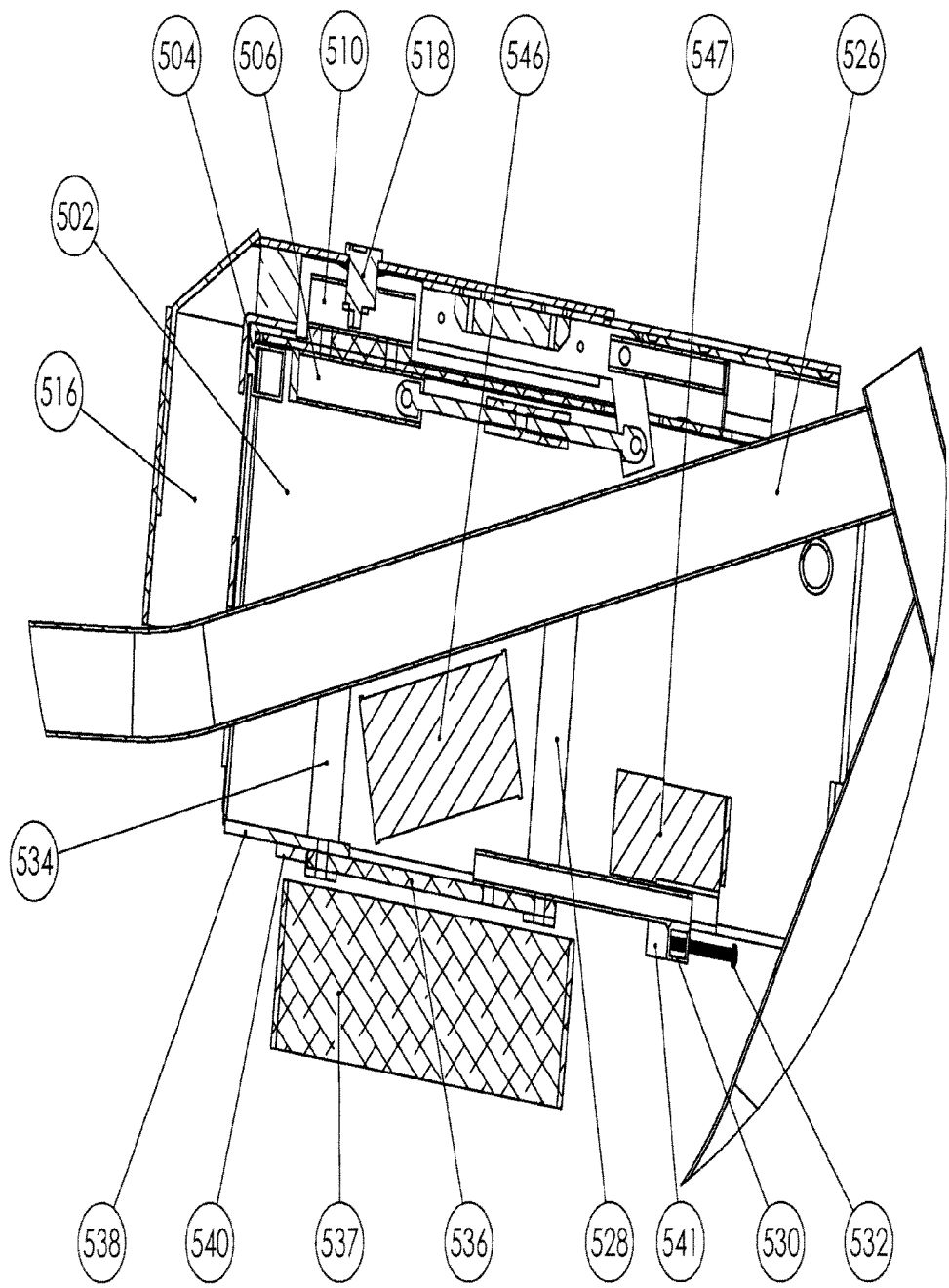
FIG. 5a illustrates a right side section view of the battery lever locked and closed.

Referring now to FIG. 5a, which illustrates a more detailed view of the battery assembly in a closed state, saddle 502 is vertically supported by center battery saddle support 536 which is coupled to crossbar 526 by battery supports 528 and 534. Front and rear battery support upper guides 530 and 538 are also rigidly coupled to support 536. Rear battery saddle lower guide 540 is coupled to saddle 502 such that saddle support upper guide 538 allows lower guide 540 to slide substantially forward and backward and prevent vertical motion of the rear of the saddle. Front battery saddle guide 541 is coupled to the underside of the front region of the saddle 502, and has a guide pin 532 extending forward and passing through a guide hole in the front battery saddle support guide 530. The front guide pins 532 prevent the front of the saddle from moving vertically and from spreading laterally. Front battery saddle guide 541 also supports ignition solenoid 547.

Also illustrated in FIG. 5a are battery saddle upper retainer 504, battery saddle tie rod anchor 506, key lock receiver 510 which is situated below key lock 518 and battery saddle release lever 516. DC/DC converter 546 is adjacent to motor controller 537.

Figure 5B:
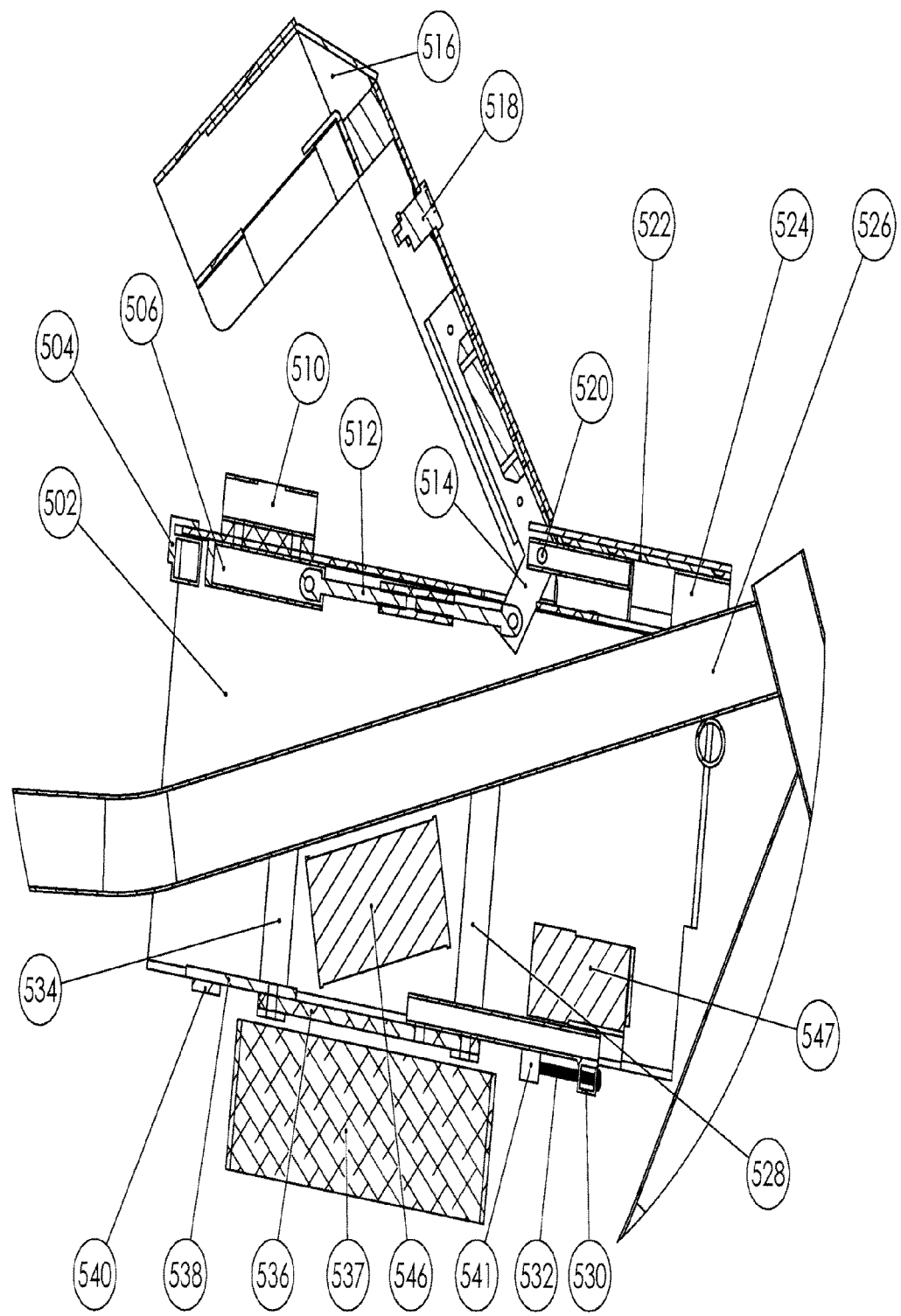
FIG. 5b illustrates a right side section view of the battery lever unlocked and open.

In FIG. 5b, battery saddle lever 514 pivots about axis 520 of battery saddle lever pivot anchor 522 which is fixedly coupled to the crossbar 526 through frame anchor 524. As the battery saddle release lever 516 is opened, battery saddle lever 514 pushes the adjustable-length battery saddle tie rod 512 pivotably coupled to tie rod anchor 506 which is fixedly coupled to battery saddle 502. Battery saddle release lever 516 also provides mechanical advantage to battery saddle lever 514 to overcome the high forces required to disconnect the battery high power electric connector 419 from the fixed high power electric connector 420 (see FIGS. 4a and 4b).

When battery saddle release lever 516 is lifted, saddle 502 is pushed rearward and moves the batteries with it and away from the fixed high power electrical connectors 420 (see FIG. 4b) thus electrically and mechanically disconnecting the batteries from the power assisted vehicle. With the battery saddle release lever in the open state, lateral restraint of the rear of the batteries is lost allowing the batteries to be pivoted outward and removed from the power assisted vehicle. The quick release functionality allows for ready removal of batteries for charging, theft prevention and monitoring of battery status when the power assisted vehicle is at rest.

Another element of interest in some embodiments of the power assisted vehicle, is the motor mount assembly. As illustrated in FIG. 1, motor mount assembly 140 couples motor 118 to frame 142 and provides support for a vehicle center stand 138. As shown in FIG. 3, motor mount assembly 324 is connected via left and right gussets 328 and 326 to the frame. FIG. 6a illustrates a perspective view of motor mount assembly 602 with the center stand 604 in the "down" position, while FIG. 6c illustrates a similar view with center stand 604 in the "up" position. As shown in FIG. 6b, center stand 604 pivots about center stand pivot axis pin 606 which defines pivot axis 608 (see FIG. 6c). Center stand 604 is sprung into either of two stable positions by center stand spring 610 by incorporating an over-center geometry such that when the center stand 604 is in the "down" position as illustrated by FIG. 6a, center stand spring 610 applies a force in front of the pivot axis 608 further biasing the "down" position. When the center stand 604 is in the "up" position as illustrated by FIG. 6d, center stand spring 610 applies a force behind the pivot axis 608 further biasing the up position. The above provides the center stand with unusual stability in either up and down positions.

Figure 6:
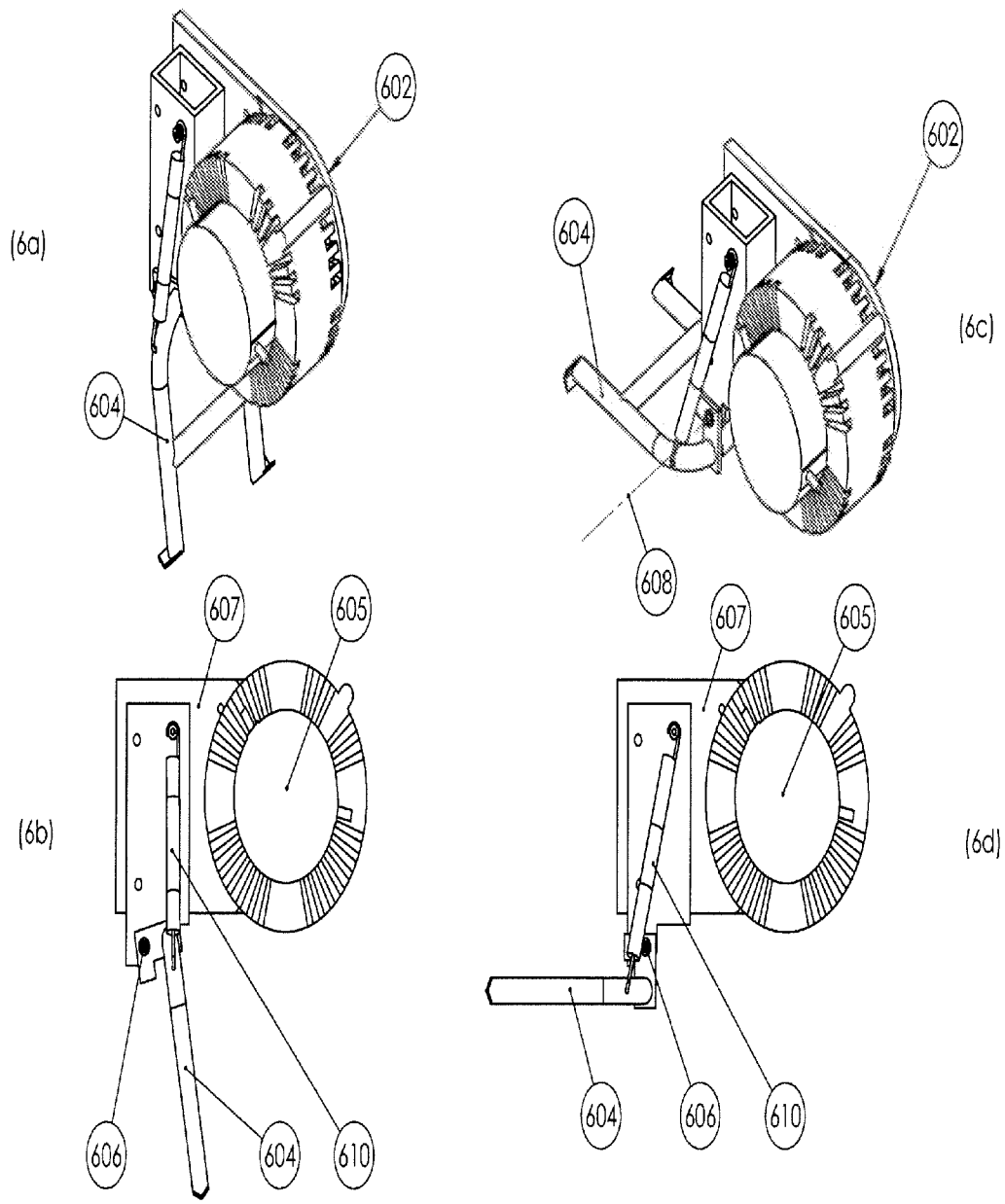
FIG. 6a illustrates an orthographic view of the motor mount assembly with the kickstand down.
FIG. 6b illustrates a right side view of the motor mount assembly with the kickstand down.
FIG. 6c illustrates an orthographic view of the motor mount assembly with the kickstand up.
FIG. 6d illustrates a right side view of the motor mount assembly with the kickstand up.

Typical gasoline-powered cycles often integrate a center stand into the engine housing. As shown in FIG. 6, motor mount assembly 602 couples the electric motor 605 to the frame by means of a motor mount 607 which also supports center stand 604.

The motor mount assembly and battery saddle assembly illustrated in the figures above can also be used as a drop-in replacement or as a kit to convert gasoline-burning motor-assisted cycles into electric motor-assisted cycles. The specific mount geometry of the present motor mount assembly is compatible with many popular gasoline-burning mopeds.

The motor mount assembly provided herein integrates the motor with the center stand. The center stand, because of the features described above is unexpectedly stable and allows, for example, pedaling to recharge the battery while the power assisted vehicle is stationary.

Some embodiments of the power assisted vehicle include a protective cable housing. Electrically powered vehicles have substantially more electrical wiring when compared to gasoline or manually powered cycles. Accordingly, properly routing wiring and protecting wiring from external damage and fatigue are particularly significant in an electrically powered vehicle.

Electronic components such as headlights, instrument panels and electromechanical controls such as throttle and brake are often mounted on steering assemblies that pivot with respect to frames supporting their electric power supplies and master control units. Referring to FIG. 1, front fork steering assembly 102 which is supported by frame 142 and crossbar 116 pivots about steering assembly pivot axis 103. Upper cable harness electronics 108 are connected to semi-rigid upper cable harness housing 110 that is anchored to and moves with front fork steering assembly 102.

Figure 7:
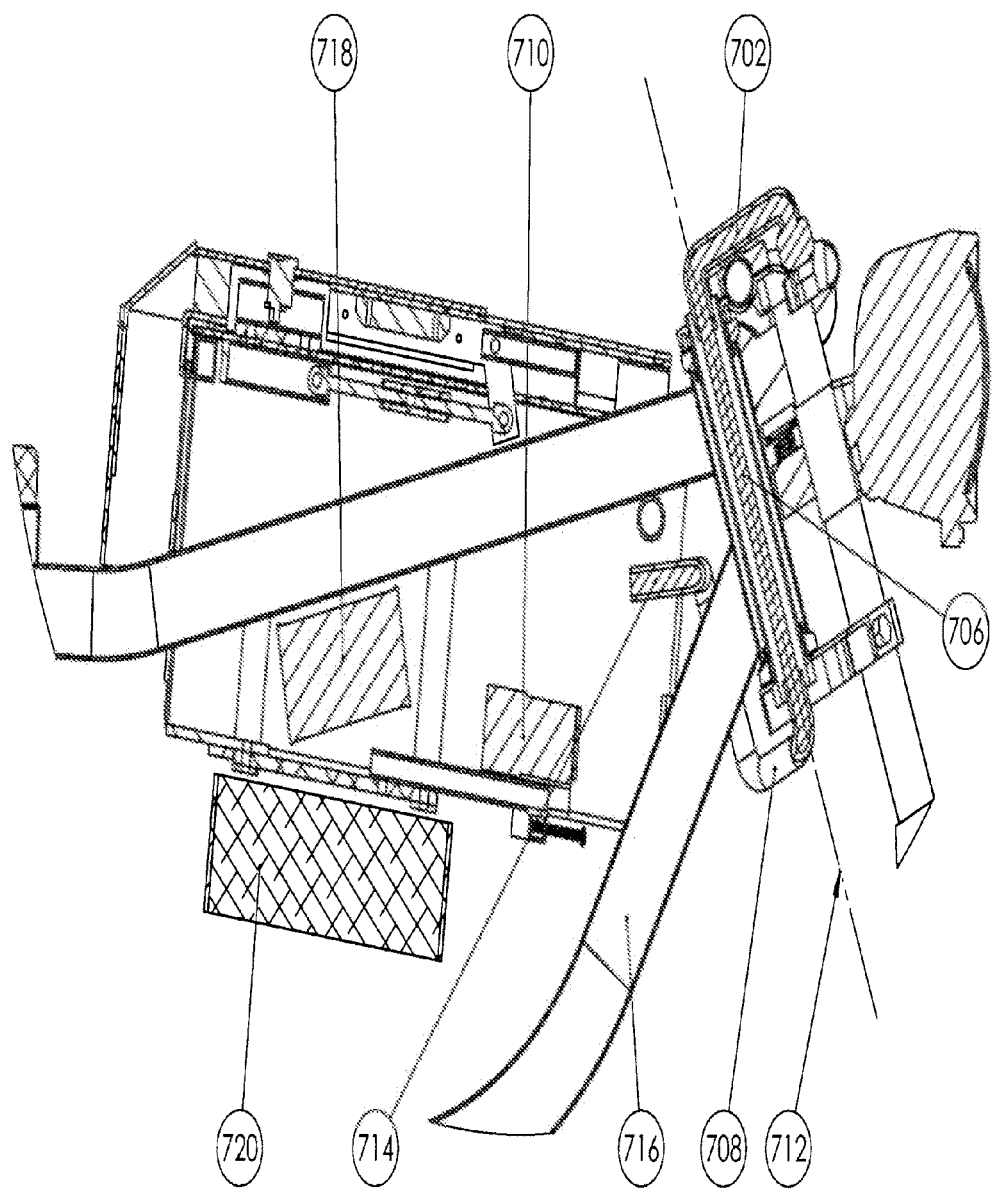
FIG. 7 illustrates the upper cable housing in detail.

Referring now to FIG. 7, semi-rigid lower cable harness 708 is fixedly coupled to frame 716 such that when the steering assembly is rotated, housing 702 rotates with respect to housing 708. Cable harness twisting member 706 connects upper cable harness housing 702 to semi-rigid lower cable harness housing 708, and passes substantially coaxially to axis 712.

Lower cable harness wires 714 exit the lower cable harness housing 708 and connect to fixed electric components such as the DC/DC converter 718, motor controller 720, and ignition solenoid 710.

Traditional mechanical twist grip throttles such as on motorcycles function by wrapping a cable around a pulley connected to a hand grip. Twisting the hand grip pulls a central cable through a cable housing. The relative motion of the cable through the cable housing is received by components such as, for example, the carburetor of a gasoline-powered motorcycle.

Throttle assemblies for electric vehicles typically have three electrical wires extending from the housing that connect to a motor control unit. These transducers convert mechanical input from the user in such forms as thumb motion, twisting of a hand grip, or pressing a foot pedal into electrical signal. Often the user experience of such twist grips is inferior to traditional mechanical twist grips.

Figure 8:
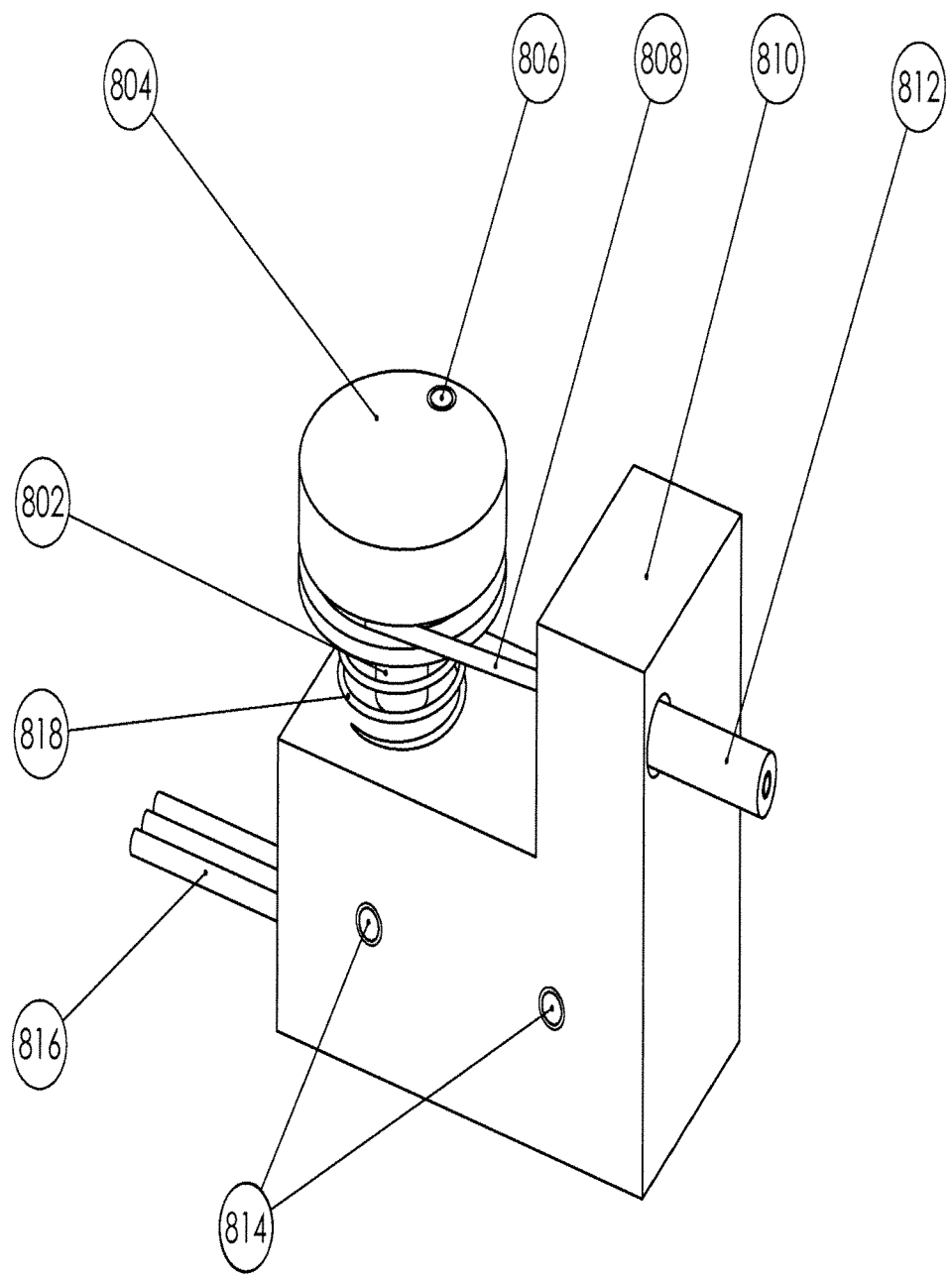
FIG. 8 illustrates an electromechanical throttle assembly, which typically is mounted on a steering assembly and converts mechanical cable motion into an electrical signal read by the motor controller.

In some embodiments, an electromechanical throttle interface assembly 104 is mounted to the front fork steering assembly 102 as shown in FIG. 1. FIG. 8 illustrates the electromechanical throttle interface assembly, which may be used in some embodiments of the power assisted vehicle in greater detail. The assembly includes a housing 810 having mounting holes 814 and an electromechanical transducer such as a potentiometer or hall-effect sensor with typically three signal wires 816. In some embodiments, a pulley 804 is attached to the end of a transducer shaft 802 which is torsionally biased by spring 818. Electromechanical throttle interface housing 810 supports one end of throttle cable housing 812 and allows throttle cable 808 to pass through. Cable 808 wraps around and is anchored to pulley 804 with set screw 806. In some embodiments, anchoring mechanisms may include molded cable features coupling to mating features in the pulley. The three signal wires 816, in some embodiments, are included in the bundle of cable harness twisting member (i.e., 706 in FIG. 7).

A traditional problem with electrically powered vehicles has been the required use of bulky and heavy lead acid batteries as a source of electric power. The introduction of lithium ion batteries dramatically decreased battery weight and increased performance and reliability of most electric vehicles. However lithium batteries require more complex and consistent cell monitoring for peak performance, efficiency and reliability.

A combination of high direct current voltage and current carrying capacity of the battery is needed to provide the electric power required by the power assisted vehicle described herein. The present battery assembly shown in FIGS. 9-11 comprises five battery bricks arranged in series, each brick comprising sixteen cells arranged in parallel in a nested pattern for space saving and structural purposes.

Figure 9:
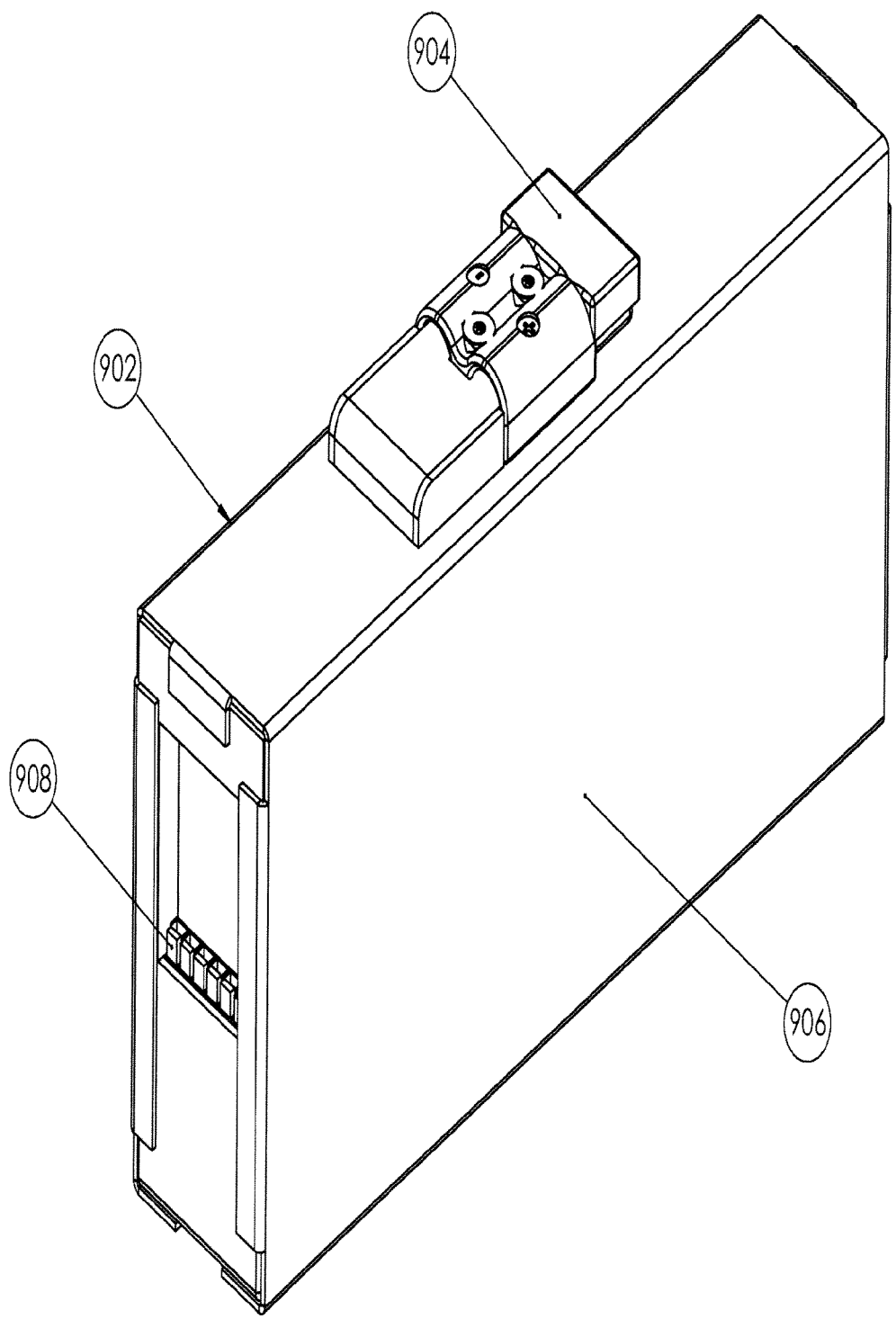
FIG. 9 illustrates a battery assembly.

Referring now to FIG. 9, high power is transmitted out of the battery 902 which is enclosed in battery enclosure housing 906 through battery high power electric connector 904. The health of each parallel battery brick is monitored by battery cell taps 908 located on one end of battery 902.

Figure 10:
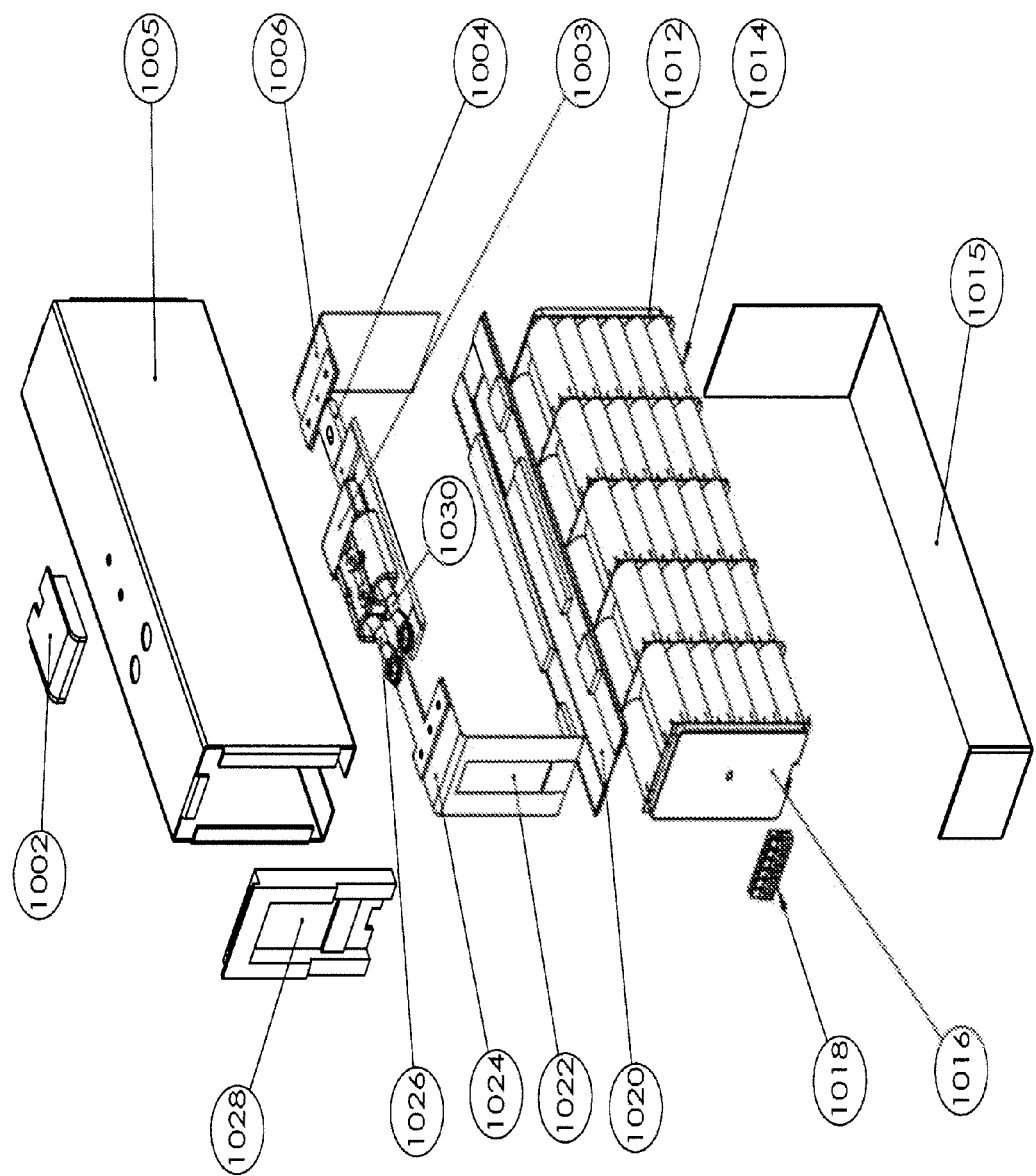
FIG. 10 illustrates an exploded orthographic battery assembly.

Referring now to FIG. 10, the negative pole of battery brick 1014 is represented by terminal plate 1016. The negative terminal contact 1024 electrically connects negative terminal plate 1016 to the negative pole of battery high power electric connector 1003 through high power connector negative wire 1026. Once assembled, contact 1024 is pressed against the negative terminal plate 1016 by compressing battery terminal contact spring 1022 against the inner wall of battery enclosure end plate 1028.

The positive pole of battery brick 1014 is represented in FIG. 10 by terminal plate 1012. The positive terminal contact 1006 electrically connects terminal plate 1012 to the battery fuse 1004. Direct current passes from the fuse 1004 to the positive pole of battery high power electric connector 1003 through high power connector positive wire 1030. A battery high power connector wire cover 1002 protects the user from exposed live wires. The battery brick assembly 1014 is insulated from exposed electronics above by insulator plate 1020.

Access to each battery brick assembly voltage is provided by battery cell tap assembly 1018 allowing monitoring of the condition of each bank of cells. Once assembled, battery cell tap assembly 1018 is supported between the inner surface of the short length of battery enclosure bottom 1015 and the outer surface of battery enclosure end plate 1028. Battery enclosure housing 1005 protects and provides structural support for internal battery electronics.

Figure 11:
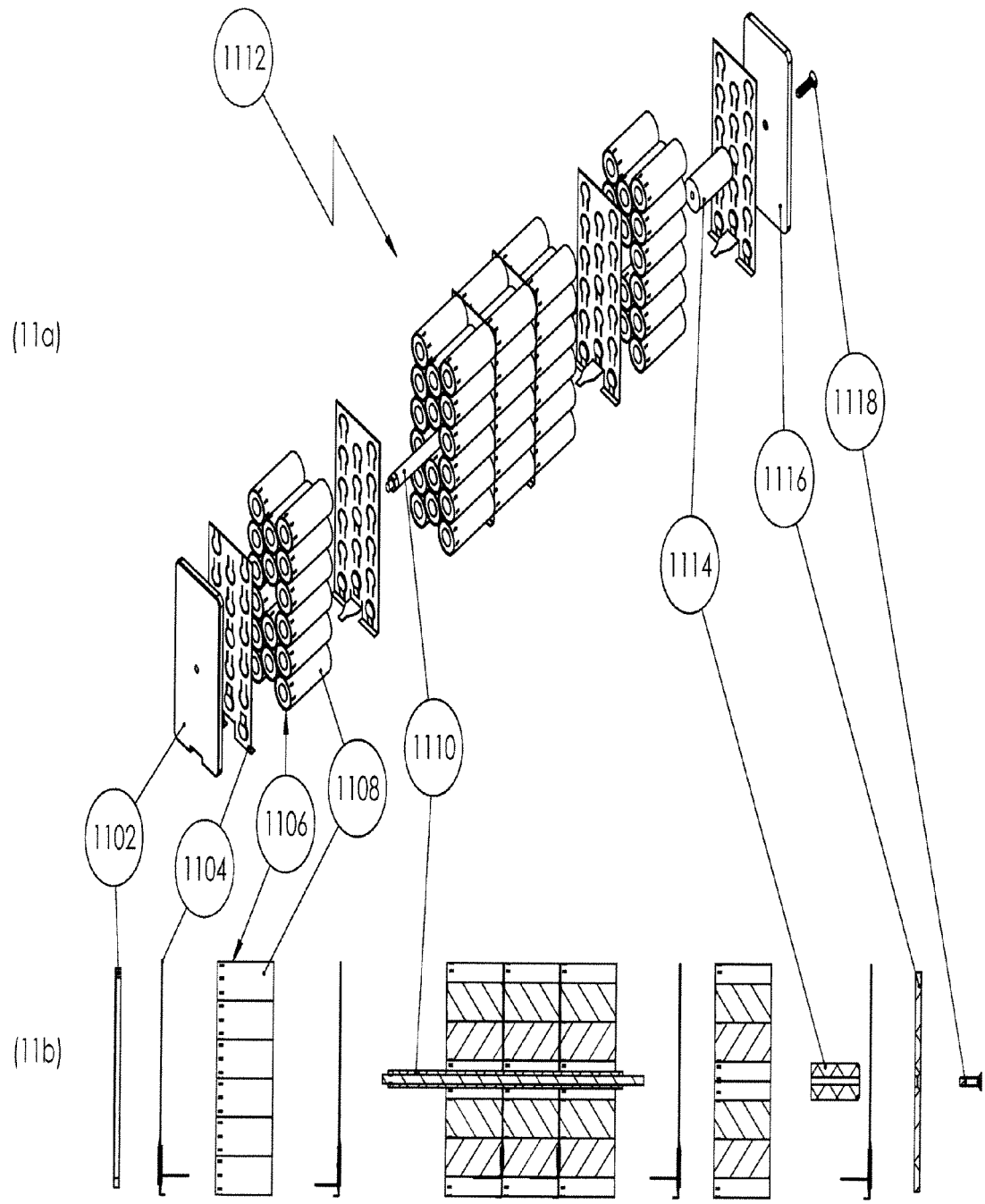
FIG. 11a illustrates a battery brick assembly exploded.
FIG. 11b illustrates a section view of the battery assembly.

FIG. 11 illustrates an exploded view of battery brick assembly 1112 in an orthographic projection (a) and in a section view (b). Battery brick terminal plates 1102, 1116 form the negative and positive poles, respectively, of battery brick assembly 1112. In some embodiments, cylindrical battery cells 1108 are arranged in parallel in a space-saving lattice to form high-current, low-voltage parallel battery bricks 1106. Bricks 1106 are arranged in series to form a high-current, high voltage battery brick assembly 1112.

Battery port contact spring plates 1104 are compressed between neighboring bricks 1106. Plates 1104 ensure electrical contact between cells 1108 of neighboring bricks 1106 and provide external access to monitor the voltage across each brick 1106 in brick assembly 1112 as required to optimally harness stored battery pack energy.

The rigidity of battery brick terminal plates 1102, 1116 allows for a uniform compressive force to be applied to the ends of brick assembly 1112. A single insulated battery tie rod 1110 passes through the center region of brick assembly 1112 and attaches to negative terminal plate 1102. Insulated tie rod nut 1114 mechanically couples battery brick terminal plate screw 1118 to tie rod 1110 and electrically isolates positive terminal plate 1116 from negative terminal plate 1102.

FIG. 11b shows a section view of battery brick 1112 in the exploded view of FIG. 11a. Battery tie rod 1110 is shown passing through the center region of both the battery bricks 1106 and spring plates 1104. To remain within the physical boundaries of the battery brick assembly 1112, the leftmost (most negative) spring plate 1104 is oriented in the opposite direction from the other spring plates 1104. FIG. 11b further illustrates an assembly order of components that comprise battery brick 1112.

The use of standard connectors for both high power transmission and low power cell monitoring allows the battery to be configured in series and in parallel and monitored with many standard off-the-shelf battery management systems.

Finally, it should be noted that there are alternative ways of implementing the present invention. Accordingly, the present embodiments are to be considered as illustrative and not restrictive, and the invention is not to be limited to the details given herein, but may be modified within the scope and equivalents of the appended claims.

What is claimed is:
1. A power assisted vehicle comprising:
   a frame connected to at least a rear fork capable of supporting a wheel having a first driven sprocket assembly and a second driven sprocket assembly;

a rechargeable electrical power supply including at least one battery and attached to the frame;

a motor controller attached to the frame, the power supply being electrically connected to the motor controller;

an electric motor supported by the frame and attached to a first driving sprocket which is coupled to the first driven sprocket assembly;

a manual pedal assembly supported by the frame and comprising a pedal crank shaft, two pedals and a second driving sprocket that is coupled to the second driven sprocket assembly;

a battery saddle coupled to the frame, wherein the at least one battery is supported by the battery saddle; and a lockable lever attached to the battery saddle and configured to control removal of the at least one battery and to prevent theft of the at least one battery.

2. The vehicle of claim 1, wherein the power supply includes battery bricks arranged in series, and a housing equipped with cell taps and a high power connector; wherein the battery bricks comprise cells arranged in parallel.

3. A power assisted vehicle comprising:

a frame connected to at least a rear fork capable of supporting a wheel having a first driven sprocket assembly and a second driven sprocket assembly;

a rechargeable electrical power supply including at least one battery and attached to the frame;

a motor controller attached to the frame, the power supply being electrically connected to the motor controller;

an electric motor supported by the frame and attached to a first driving sprocket which is coupled to the first driven sprocket assembly;

a manual pedal assembly supported by the frame and comprising a pedal crank shaft, two pedals and a second driving sprocket that is coupled to the second driven sprocket assembly;

a battery saddle coupled to the frame, wherein the battery is supported by the battery saddle; and a lockable lever attached to the battery saddle and configured to control removal of the battery wherein the lockable lever is lockable with a manual key activated lock.

4. A power assisted vehicle comprising:

a frame connected to at least a rear fork capable of supporting a wheel having a first driven sprocket assembly and a second driven sprocket assembly;

a rechargeable electrical power supply including at least one battery and attached to the frame;

a motor controller attached to the frame, the power supply being electrically connected to the motor controller;

an electric motor supported by the frame and attached to a first driving sprocket which is coupled to the first driven sprocket assembly;

a manual pedal assembly supported by the frame and comprising a pedal crank shaft, two pedals and a second driving sprocket that is coupled to the second driven sprocket assembly;

a battery saddle coupled to the frame, wherein the battery is supported by the battery saddle; and a lockable lever attached to the battery saddle and configured to control removal of the battery wherein the lockable lever is lockable with an electronic solenoid.

5. The vehicle of claim 1, wherein the solenoid is electrically coupled to an ignition circuit.

6. A semi-flexible cable harness assembly for a power assisted vehicle comprising:

a first cable harness housing attached to a fork of the vehicle, said housing pivoting with the fork;

a second cable harness housing attached to the frame of the vehicle; and a cable harness twisting member that connects the first cable harness housing to the second cable harness housing, said cable harness twisting member being substantially co-linear with the pivoting axis of the fork;

wherein the first cable harness is disposed such that pivoting of the fork rotates the first cable harness housing relative to the second cable harness housing.

7. The vehicle of claim 1, wherein the lockable lever is lockable using an electronic key.

8. The vehicle of claim 1, wherein the lockable lever is configured to pivot around an axis.

9. The vehicle of claim 1, wherein the lockable lever is configured to push against the battery saddle.

10. The vehicle of claim 1, wherein the lockable lever is configured to apply a mechanical force to disconnect an electrical connector of the at least one battery.

11. The vehicle of claim 1, wherein the lockable lever includes a saddle release lever (516) and further comprising a battery saddle lever (514) configured to push against the at least one battery.

12. The vehicle of claim 1, wherein the lockable lever includes a battery saddle lever (514) and further comprising a battery release lever (516) including an electronic or mechanical lock.

13. The vehicle of claim 1, wherein the lockable lever is configured to push the battery saddle, pushing the battery saddle resulting in disconnecting an electrical connector of the at least one battery.

14. The vehicle of claim 1, wherein the battery saddle is configured to support at least a first battery and a second battery, the first battery and the second battery including the at least one battery and being disposed on opposite sides of the frame.

15. The vehicle of claim 14, wherein the first battery and the second battery each include a plurality of battery cells.

16. The vehicle of claim 15, wherein the lockable lever is configured for disconnecting an electrical connector of the first battery and for disconnecting an electrical connector of the second battery.

17. The vehicle of claim 14, wherein the lockable lever is configured to generate a force to move both the first battery and the second battery.

18. The assembly of claim 6, wherein the second cable harness is coupled to a DC/DC converter.

19. The assembly of claim 6, wherein the second cable harness is coupled to a motor controller.

20. The assembly of claim 6, wherein the second cable harness is coupled to an ignition solenoid.

* * * * *